United States Patent [19]

Semichon et al.

[11] 3,739,243

[45] June 12, 1973

[54] SEMICONDUCTOR DEVICE FOR PRODUCING OR AMPLIFYING ELECTRIC OSCILLATIONS

[75] Inventors: Alain Semichon, Choisy-le-Roi; Jacques Michel, Ville Luve Saint-Georges, both of France

[73] Assignee: U.S. Philips Corporation, New York, N.Y.

[22] Filed: May 16, 1972

[21] Appl. No.: 253,787

Related U.S. Application Data

[63] Continuation of Ser. No. 99,064, Dec. 17, 1970.

[30] Foreign Application Priority Data

Dec. 24, 1969 France .............................. 6944987

[52] U.S. Cl. .... 317/235 R, 317/235 L, 317/235 T, 317/235 UA

[51] Int. Cl. .............................................. H01l 9/00

[58] Field of Search ................... 317/235, 25.1, 30, 317/31

[56] References Cited

UNITED STATES PATENTS

| | | | |
|---|---|---|---|
| 3,560,809 | 2/1971 | Terakado | 317/234 |
| 3,585,469 | 6/1971 | Jäger et al. | 317/234 |

OTHER PUBLICATIONS

Sze et al., "Solid State Electronics," Vol. 12, No. 2, February, 1969.

Chang et al., "IBM-Tech. Bulletin," Vol. 11, No. 2, July, 1968.

*Primary Examiner*—John W. Huckert
*Assistant Examiner*—E. Wojciechowicz
*Attorney*—Frank R. Trifari

[57] ABSTRACT

An avalanche transit time microwave device as described, employing a Schottky barrier.

6 Claims, 4 Drawing Figures

Figure 1:
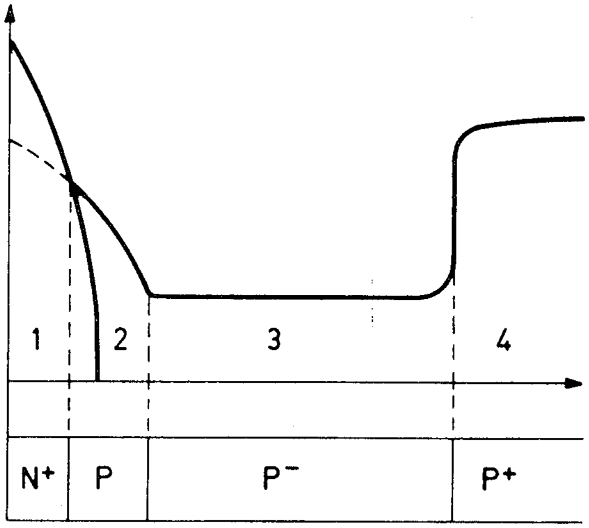

INVENTORS
ALAIN SEMICHON
BY JACQUES MICHEL
AGENT

INVENTORS
ALAIN SEMICHON
BY JACQUES MICHEL
Frank R. Trifari
AGENT

SEMICONDUCTOR DEVICE FOR PRODUCING OR AMPLIFYING ELECTRIC OSCILLATIONS

This is a continuation of application Ser. No. 99,064, filed Dec. 17, 1970.

The invention relates to a semiconductor device for producing or amplifying electric oscillations having a tunnel-transit time diode comprising a body having a layer of a first semiconductor material which is present between a region of a second material which makes a rectifying contact with the layer and a region of a third material which forms an electrically readily conducting contact with the layer.

Devices having diodes with negative differential resistance for very high frequencies, in which use is made of avalanche multiplications by means of impact ionization in a semiconductor body combined with the transit time of charge carriers in a depletion zone are known. When in the operating condition of these devices a sinusoidal voltage is superimposed upon the voltage in the reverse direction, necessary for maintaining the avalanche multiplication, the density of movable charge carriers is periodically increased by it with a delay which is inherent in the cumulative multiplication of charge carriers. As a result of the strong electric field, said charge carriers in the depletion zone move with a saturation rate which is independent of the field strength. During the whole transit time a corresponding current flows in the external circuit, which current is shifted relative to the voltage applied across the device. This shift is located within a given frequency interval between $\pi/2$ and $3\ \pi/2$ radials. So within the said frequency interval, the real part of the impedance of the diode is negative.

Various constructions of such "avalanche transit time diodes" are known both very simple structures, as well as more complicated structures such as, for example, the structure by W.T. Read (Bell System Technical Journal, vol. 37, March, 1958, pp. 401–446), in which the avalanche multiplication takes place in a very narrow region near a p-n junction. Technologically, this latter structure is very difficult to manufacture. Apart from this, said avalanche transit time diodes have the common drawback that the noise level is very high as a result of the vehement impact ionization.

Furthermore are known diodes described by V.K. Aladinski (Soviet Physics Semiconductors, Vol. 2, nr. 5, November, 1968) and W.T. Read (Bell System Technical Journal, Vol. 37, March, 1958, p. 440) in which a tunnel effect at a p-n junction is used instead of avalanche multiplication. These diodes, so-called "tunnel transit time diodes" have a considerably lower noise level then the already described avalanche transit time diodes. An important drawback of such diodes, however, is that said known structures having p-n tunnel junction are very difficult to manufacture.

It is one of the objects of the invention to provide a structure having a low noise level which can be used within a wide frequency range and can also be manufactured in a simple and reproducible manner.

For that purpose, the invention is inter alia based on the recognition of the fact that such a structure can be obtained by using as a tunnel junction a metal-semiconductor junction to be polarized in the reverse direction.

Therefore, according to the invention, a semiconductor device of the type described in the preamble is characterized in that the second material is a metal and that at least the part of the semiconductor layer which is in contact with the said metal has such a high doping that, when a voltage is applied in the reverse direction across the said metal-semiconductor junction, charge carriers move across said junction as a result of a tunnel effect.

Since a rectifying semiconductor junction (Schottky junction) of the type in question can be manufactured at comparatively low temperatures, the device according to the invention can very much more easily be manufactured in a reproducible manner than the said known tunnel transit time diodes of Aladinskii and Read. In addition it is found that the device according to the invention can be used within a wider frequency range than the known devices.

An important preferred embodiment according to the invention is characterized in that the semiconductor layer consists of a highly doped substrate of a conductivity type on which an epitaxial layer of the same conductivity type has been provided which makes a rectifying contact with the said metal, the side of the substrate remote from the epitaxial layer contacting the third material. The third material will generally make a non-rectifying contact with the said semiconductor layer. In circumstances, however, a material which makes a rectifying contact with the above-mentioned semiconductor layer, said contact being polarized in the forward direction in the operating condition may also be used as the third material.

The structure of the epitaxial layer may be homogenous. According to an important preferred embodiment, the epitaxial layer is composed of two successive zones of different doping concentrations, the zone having the higher doping forming the rectifying metal-semiconductor contact with the said metal. The zone having the higher doping advantageously is a layer diffused in the epitaxial layer but it may also be obtained differently, for example, by ion implantation in the epitaxial layer or by variation in the doping during the epitaxial growing.

Silicon or gallium arsenide are preferably used as materials for the said semiconductor layer.

Figure 2:
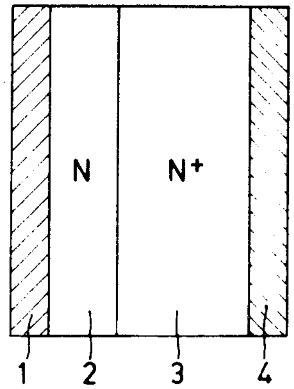
Figure 3:
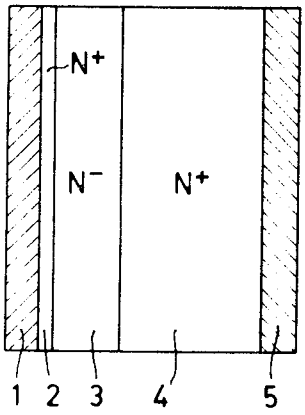
Figure 4:
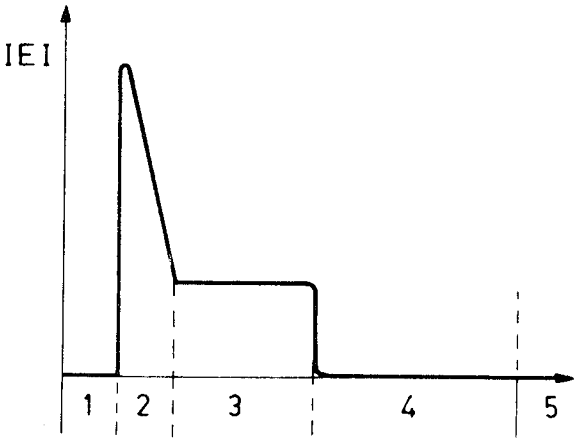

In order that the invention may be readily carried into effect, a few embodiments thereof will now be described in greater detail, by way of example, with reference to the accompanying drawings, in which:

FIG. 1 shows the doping profile across a cross-section of a known diode according to Read, FIG. 2 is a diagrammatic cross-sectional view of a device according to the invention, FIG. 3 is a diagrammatic cross-sectional view of another device according to the invention, and FIG. 4 diagrammatically shows the variation of the electric field in the device shown in FIG. 3.

FIG. 1 diagrammatically shows the doping profile across a cross-section of a known Read diode. With a sufficiently large reverse voltage across the p-n junction, avalanche multiplication takes place in such a device in a very narrow p-n junction, and the charge carriers move through an adjacent depletion zone which is of such a thickness that the transit time of the carriers through said zone is approximately half a cycle of the operating frequency chosen (this transit time is equal to the ratio between the thickness of the traversed zone and the saturation rate of the charge carriers, which saturation rate for silicon is approximately $10^7$ cm/sec.). The regions 1 and 2 form the abrupt p-n junction where the avalanche is localized, the zone 3 is the zone traversed by the generated charge carriers, and the region 4 is a semiconductor substrate having a very high doping of any thickness which serves as a substratum.

The doping profile together with the voltage applied across the diode determines the field distribution in the various zones. It is necessary for the avalanche to be restricted to a region which is as thin as possible, near the p-n junction between the zones 1 and 2, and for the electric field strength in the zone 3 to be sufficient ( 24 $10^4$ Vcm) so as to cause the charge carriers to traverse said zone with the saturation rate, but none too high since the avalanche is not allowed to extend up to said zone 3. Therefore, the manufacture of such a diode presents great difficulties, in particular of a technological nature.

A first possibility of manufacturing a device according to the invention is shown in FIG. 2. The device comprises a monocrystalline silicon plate (2, 3) having an overall thickness of approximately 50 microns. A metal layer 4 constituted by a 0.1 micron thick titanium layer covered with a gold layer is in ohmic contact with the semiconductor substrate 3 of n-type silicon, which has a doping of $5 \times 10^{18}$ donor atoms/$cm^3$.

The zone 2 has a thickness of approximately 1 micron and has been grown epitaxially on the substrate 3. The zone 2 has a substantially homogeneous doping of $10^{18}$ donor atoms/$cm^3$.

The zone 1 consists of a platinum layer provided on the zone 2 and forming a rectifying metal-semiconductor contact with the zone 2.

The structure shown in FIG. 2 is operated with a voltage in the reverse direction across the metal-semiconductor contact (1, 2), the applied voltage being so high that the formed depletion zone extends throughout the zone 2.

The doping of the zone 2 is so high that charge carriers move across the metal-semiconductor junction (1, 2) as a result of a tunnel effect between the zones 1 and 2.

The operating frequency is determined by the thickness of the depletion zone and in this example is 100 GHz ($10^{11}$ $sec^{-1}$) with a depletion zone of 1 micron thickness.

According to another embodiment, see FIG. 3, the device comprises a monocrystalline semiconductor plate (2, 3, 4) having an overall thickness of 50 microns. A metal layer 5 consisting of a gold-covered, 0.1 micron thick titanium layer is in ohmic contact with the semiconductor substrate 4 of n-type silicon. The zones 2 and 3 are formed by an epitaxial layer grown on the substrate 4, in which layer the zone 2 has been provided by diffusion of, for example, phosphorus. The zone 2 has a thickness of 0.2 microns and comprises at the surface a doping concentration of $10^{18}$ donor atoms/$cm^3$ the zone 3 has a thickness of 4 microns and a substantially homogeneous doping concentration of $5.10^{14}$ donor atoms/$cm^3$, the substrate zone 4 has a doping concentration of $10^{19}$ donor atoms/$cm^3$. A platinum layer which forms a rectifying metal-semiconductor junction with the zone 2, is provided on the surface of the zone 2. The doping concentration of the zone 2 at the area of the metal-semiconductor contact is so high that in the operating condition when a voltage is applied across the device such that the metal-semiconductor contact is polarized in the reverse direction, charge carriers flow across the metal-semiconductor junction as a result of a tunnel effect. The holes disappear immediately in the metal 1, while the electrons traverse the zone 3 causing a current in the external circuit. The voltage across the device is at least chosen to be so high that the depletion zone extends across the zones 2 and 3. FIG. 4 diagrammatically shows the profile of the field strength across the device.

It will be obvious that the invention is not restricted to the examples described, but that many variations are possible to those skilled in the art without departing from the scope of this invention. For example, the semiconductor material used may also consist of other semiconductors, for example, gallium arsenide, and the semiconductor body may consist of two or more different semiconductor materials. The contacts (3, 4) in FIG. 2 and (4, 5) in FIG. 3, respectively, may also be rectifying junctions polarized in the forward direction. Besides by diffusion, the zone 2 in FIG. 3 may also be formed by doping variation during the epitaxial growing or by ion implantation. The device according to the invention may consist of a diode as described above in combination with other circuit elements and thus form a monolithic or non-monolithic integrated circuit. The diodes described may be used in the same manner as known avalanche transit time diodes and be operated to considerably higher frequencies, to above 50 GHz ($5 \times 10^{10}$ $sec^{-1}$).

We claim:

1. A semiconductor device for producing or amplifying electric oscillations and comprising a tunnel-transit time diode, said diode comprising a body having a first layer of silicon semiconductor material with a relatively high doping at its surface of at least $10^{18}$ atoms per cubic centimeter, a second metal in contact with said doped surface of the layer and forming with the layer a rectifying contact and a metal-semiconductor junction, a third region of a material forming a good electrically conducting contact with the layer, and means for applying across the second metal and the third region a potential of such polarity as to reverse bias the metal-semiconductor junction, the doping of said first layer surface in contact with the second metal being so high as to enable charge carriers to tunnel across said reverse biased metal-semiconductor junction into the first layer, said reverse bias potential being of such magnitude as to form a depletion region in the first layer and to cause the tunneling charge carriers to travel across the first layer in the depletion region at their saturation rate.

2. A device as set forth in claim 1 wherein the relatively highly doped surface has a thickness of 1 micron or less.

3. A device as set forth in claim 2 wherein the first layer comprises a substrate portion of one type conductivity and a surface portion of the same type conductivity but of different magnitude, said second metal being on the surface portion, and the third region contacting the substrate portion.

4. A device as set forth in claim 2 wherein the surface portion comprises successive zones of different doping concentrations with the second metal on the zone of higher doping.

5. A device as set forth in claim 2 wherein the higher doping zone has a doping concentration gradient that decreases from the surface into the bulk.

6. A device as set forth in claim 2 wherein the first layer has two parts, a first thin surface part with the said relatively high doping, and a second thicker part with a lower doping level.

* * * * *